US008214529B2

(12) United States Patent
Kanevsky et al.

(10) Patent No.: US 8,214,529 B2
(45) **Date of Patent: *Jul. 3, 2012**

(54) AUTOMATIC NETWORK CLUSTER PATH MANAGEMENT

(75) Inventors: Arkady Kanevsky, Swampscott, MA (US); James F. Lentini, Woburn, MA (US)

(73) Assignee: Netapp Inc., Sunnyvale, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 12/759,553

(22) Filed: Apr. 13, 2010

(65) Prior Publication Data

US 2010/0198985 A1 Aug. 5, 2010

Related U.S. Application Data

(63) Continuation of application No. 12/113,053, filed on Apr. 30, 2008, now Pat. No. 7,725,603.

(51) Int. Cl.
*G06F 15/16* (2006.01)
*G06F 12/00* (2006.01)

(52) U.S. Cl. ........................................ 709/245; 709/204

(58) Field of Classification Search .................. 709/204, 709/239–245
See application file for complete search history.

(56) References Cited

U.S. PATENT DOCUMENTS

| | | | | |
|---|---|---|---|---|
| 6,070,191 | A * | 5/2000 | Narendran et al. | 709/226 |
| 7,516,285 | B1 | 4/2009 | Haynes et al. | |
| 7,590,747 | B2 * | 9/2009 | Coates et al. | 709/229 |
| 7,639,383 | B2 * | 12/2009 | Oliszewski et al. | 358/1.15 |
| 2003/0214940 | A1 * | 11/2003 | Takken | 370/352 |
| 2005/0100026 | A1 * | 5/2005 | Mancour | 370/400 |
| 2005/0124299 | A1 * | 6/2005 | Scribano et al. | 455/68 |
| 2007/0022138 | A1 | 1/2007 | Erasani et al. | |
| 2007/0168693 | A1 | 7/2007 | Pittman | |
| 2008/0057931 | A1 * | 3/2008 | Nass et al. | 455/419 |
| 2008/0130627 | A1 * | 6/2008 | Chen et al. | 370/351 |
| 2008/0209070 | A1 * | 8/2008 | Horn | 709/238 |
| 2009/0157902 | A1 * | 6/2009 | Saffre et al. | 709/242 |

OTHER PUBLICATIONS

Notice of Allowance mailed Jan. 13, 2010 for U.S. Appl. No. 12/113,053.

* cited by examiner

*Primary Examiner* — Zarni Maung

(57) ABSTRACT

Automatic network configuration of cluster paths to access data within a cluster is described. Each node of the cluster presents to clients an image of the cluster as a single system. Each node also stores information regarding what node has particular data, as well as information about network addresses and corresponding network capabilities for the various network addresses for each node. When a node receives a request for data, the node determines a node where the request data can be accessed, determines network addresses and network capabilities for each network address of the node, and selects a path to access the node based on the determined information. The receiving node may select the path based on network type and capability, as well as load and performance of the network.

30 Claims, 7 Drawing Sheets

AUTOMATIC NETWORK CLUSTER PATH MANAGEMENT

CROSS-REFERENCE TO RELATED APPLICATIONS

This application is a Continuation application of and claims priority to U.S. application Ser. No. 12/113,053, entitled "Automatic Network Cluster Path Management", filed Apr. 30, 2008 now U.S. Pat. No. 7,725,603.

FIELD

The invention is generally related to access of data in data storage networks, and more particularly to configuration of network paths in a data storage cluster.

COPYRIGHT NOTICE/PERMISSION

A portion of the disclosure of this patent document contains material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2008, NetApp, Inc., All Rights Reserved.

BACKGROUND

A cluster of computer systems is a group of interconnected computer nodes that has central logic. The central logic may be distributed, but could also be centralized in a single device. Most current cluster implementations involve computer systems connected by a single type of network. That is, the cluster exists only on a single type of network that is used to implement the clustering. Although the computer systems within the cluster may be connected to other network types, the other network types do not allow the clustering connection between computer systems. In such cluster implementations, users and applications have only one choice of network to use for cluster communication or other type of communication between clustered computer systems.

Certain cluster implementations allow the cluster to be configured for communication with different capabilities of a network supported by the nodes. Currently two different mechanisms are commonly employed for choosing network configuration in a cluster (i.e., what network capabilities will be used for cluster communication). One mechanism involves user input to choose a network configuration for a particular end-user application. Thus, the user configures the application to use a chosen network configuration. NFS Mount is one example of a mechanism that requires runtime user input for network selection. Such control can be automated by integrating user choices into scripts or tools. Another mechanism is to incorporate network capability negotiation into a protocol, which would then be executed upon establishing a clustering communication connection. iSCSI (Internet Small Computer System Interface) is one example of such a mechanism. However, iSCSI, like other protocol negotiation schemes assumes a particular class of network (e.g., Ethernet), and then negotiation is specific to parameters of the particular network class. The protocol negotiation mechanisms do not allow for selection of different network types.

Another mechanism that is less commonly employed for choosing a network configuration is physical layer network negotiation between two ports of the cluster network irrespective of application. Such a mechanism is sometimes referred to as "autoconfig." Ethernet, Infiniband, and FibreChannel all provide such capabilities to negotiate bandwidth. However, autoconfig is primarily limited to negotiating network bandwidth, and like the mechanisms discussed above, autoconfig is limited to one network type.

SUMMARY

A cluster of nodes has automatic network configuration of cluster paths to access data within the cluster. When multiple network types are common between two nodes in a cluster, a node can automatically select a network type for a communication session with the other node. In contrast to previous cluster communication, a network type is selected by the node, which selection is based at least in part on the network capabilities of the networks. The nodes can then communicate over the selected network. In a cluster, each node of the cluster presents to clients an image of the cluster as a single device. A client would see a single device for being able to access data, and would not see each node of the cluster. All node-to-node communication can occur transparently to the client. Each node stores information regarding what node has particular data, as well as information about network addresses and corresponding network capabilities for the various network addresses for each node. When a node receives a request for data, the receiving node determines a node in the cluster where the requested data can be accessed, determines network addresses and network capabilities for each network address of the node, and selects a path to access the node based on the determined information. The node may select the path to the remote node based on network type and capability, as well as load and performance of the network.

A node can participate in multiple clusters at the same time. Thus, the mechanisms described herein allow a node to configure paths in different clusters and participate in multiple cluster activities. For example, a node can participate in one data center storage cluster as well as a separate cluster between data centers for mirroring and backup purposes. The node has network address information and network capabilities for each node of each cluster, and uses that information to select paths in the different clusters. Such information may be stored as two separate databases of cluster information, or a single database that has an identification field for the different clusters.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As described herein, network configuration according to embodiments of the invention allows a client application on the node to select a cluster and a connection within the cluster over a network type with the highest performance capabilities. The selection of the connection can be automatic without requiring user intervention, and without limiting to a single protocol or network type. In one embodiment, such network configuration allows storage cluster communication to automatically select a network that provides the highest performance among all available networks to connect to a remote node in a storage cluster. The network selection will automatically determine what networking stack to use for cluster communication.

Nodes of a cluster can be interconnected with multiple network types. Previous clustering path management techniques selected a single network to use for clustering. As described herein, all network types can be used for clustering communication, and thus become part of the cluster. Dynamic configuration of paths allows selection of a network for a particular operation resulting in the best performance available. Each of the networks inherently has certain network capabilities (e.g., bandwidth, security), and also will have operating characteristics (e.g., traffic load) that can affect the performance of communication and data transfer over the network. Selecting and configuring a network path in the cluster can be based on such network capabilities. In one embodiment, each node of the cluster stores network configuration information for the node itself as well as information about remote nodes in the cluster. The nodes can then determine where requested data is located within the cluster, identify network connections to access the data, and select a preferred path. Each node in the cluster is a device or computing system having communication ports, each of which has a defined address and mask configuration. For simplicity, the devices in the cluster will be referred to herein as "nodes."

Figure 1:
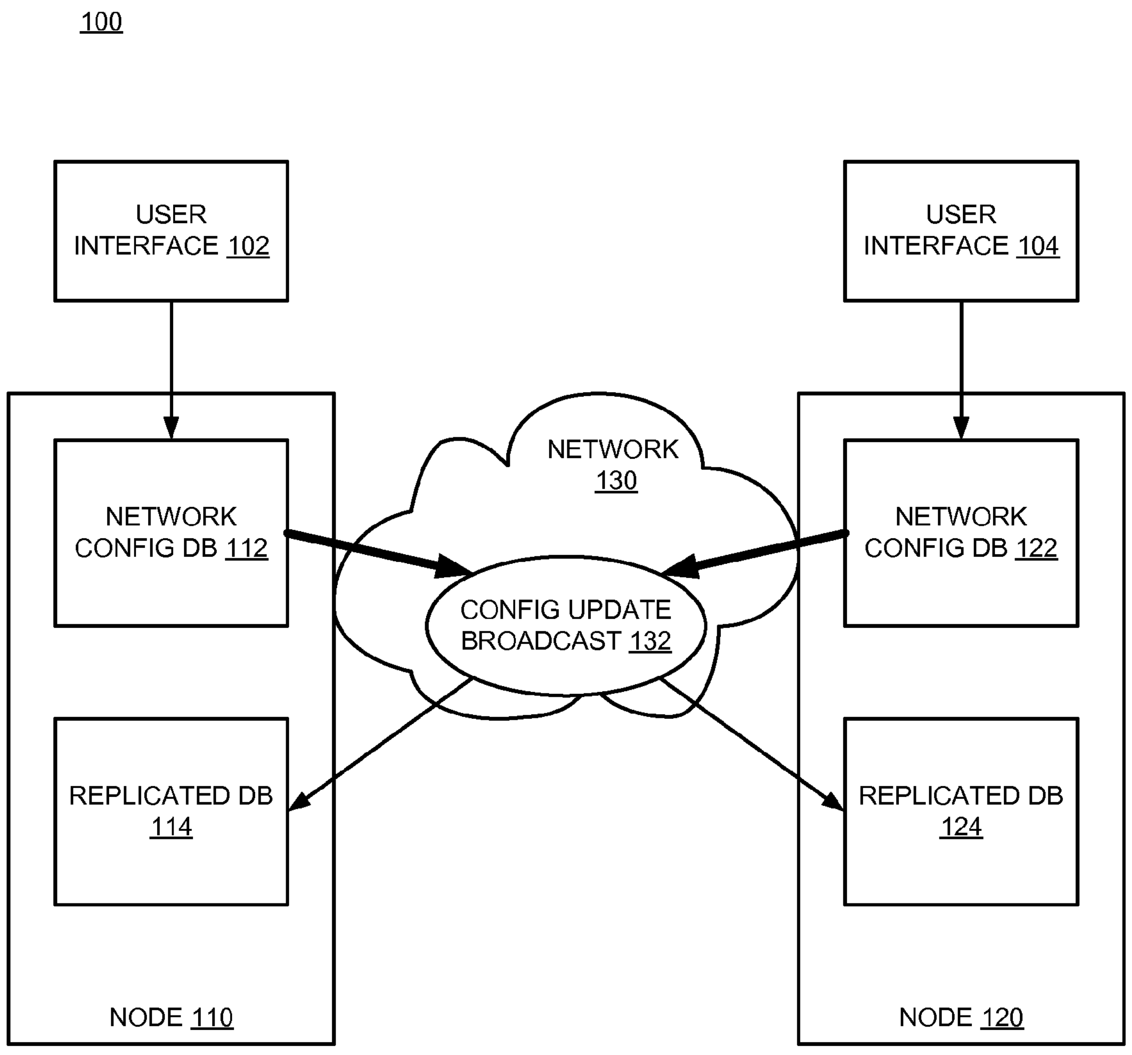
FIG. 1 is a block diagram of an embodiment of a cluster of nodes having nodes that automatically configure cluster paths based on configuration information shared in the cluster.

FIG. 1 is a block diagram of an embodiment of a cluster of nodes. The nodes automatically configure cluster paths based on configuration information shared in the cluster. Cluster 100 is a cluster of computing systems coupled together by multiple networks, such as network 130. In one embodiment, cluster 100 is a storage cluster, where each node manages access to data stored or hosted on one or more storage resources (not shown). Cluster-wide network access information can be stored at each node, 110, 120, according to the cluster architecture shown.

Nodes 110 and 120 are nodes of the cluster, and there may be other nodes in the cluster. Each node in the cluster is a potential point of access to the cluster for users. User interface (UI) 102 represents one or more mechanisms to interact with a user, such as hardware mechanisms (e.g., displays, keyboards, etc.), as well as software mechanisms (e.g., drivers and user interface software) to display or otherwise present content to a user and receive input from a user or network protocols (e.g., NFS (network filesystem), CIFS (common internet filesystem), FCP (Fibre Channel protocol), iSCSI (internet small computer system interface), etc.). In one embodiment, UI 102 represents the presentation of an end-user application to a user. UI 102 can provide a mechanism for a user to assign network address and other network communication configuration to node 110. Alternatively, node 110 may automatically be assigned network addresses to it communication ports through a network administration entity.

Nodes 110 and 120 present an image of the cluster to a user through UIs 102 and 104, respectively, of the cluster as a single device. Each node has information that indicates where data is located throughout the cluster. When a user has access to particular data (e.g., having proper authentication or complying with other security provisions), the node with which the user interacts shows all accessible cluster data as though available on the node. Thus, the user can perceive the cluster or collection of nodes as a single device. A cluster appears to a user as a single device regardless of the node used as the point of entry or access to the cluster.

In one embodiment, node 110 includes network configuration database (NCDB) 112, which stores local information about the network configuration of node 110. That is, node 110 stores information about every one of its ports: what network, what address, and what network capabilities the port has. Although shown as NCDB 112, it will be understood that the information may be stored locally without necessarily being stored and managed as a database. In implementations where database technology is used to store the information, there may be advantages in sharing the information throughout the cluster as described in more detail below.

Node 110 also includes replicated database (RDB) 114, which represents a distributed database employed within cluster 100 to store and share network configuration information for nodes in the cluster, and possibly for all clusters in which node 110 participates. RDB 114 may store information about network configuration for other nodes (e.g., node 120) in cluster 100 or another cluster (not shown). Such information stored in RDB 114 can be networks and addresses for each node in cluster 100, as well as network capabilities for each address of each node. The information is maintained using distributed database techniques to share and update the distributed database. Briefly, a change to information in the local configuration information (e.g., a user changes configuration in NCDB 112 via UI 102) can trigger an event that causes node 110 to broadcast its configuration update, or a node may broadcast its configuration or changes in node configuration periodically. The broadcast can be asynchronous, or can be coordinated with updates by other nodes in the network. Whether asynchronous or synchronous (e.g., send out information at a specified time or at a particular interval, if there are updates), configuration update broadcast 132 represents such updates. In one embodiment, a particular network 130 of cluster 100 is pre-selected or is designated for use by the nodes to send configuration update information to other nodes. Thus, the same network 130 may be used each time an update occurs. However, alternatives could also be used, such as sending information over different networks at different times, changing the broadcast network, etc. Information broadcast in configuration update broadcast 132 is received at each node, which can then update the information in RDB 114.

Node 120 is similar to node 110, with NCDB 122 to store local configuration information, and RDB 124 to store remote node information. UI 104 enables a user to directly access node 120, and may represent an end-user application through which a user can change information in NCDB 122, which will trigger an update being broadcast throughout cluster 100.

In general, configuration of paths in a cluster allows applications to run over one or more networks that support network communication capabilities required by the applications without requiring user intervention. The nodes in the cluster have communication ports, each of which has a defined address and mask configuration. The defined address and mask configuration can be automatically defined within each node, or can be user-defined. The configuration of the ports can lead to automatic extraction of network capabilities associated with the addresses. In one embodiment, the node populates a configuration database (CDB) that is local to the node with the address and network capability information local to the node for all network ports, regardless of which ports can be used for which cluster. The network capabilities stored in the CDB for an IP address include but are not limited to network port bandwidth, MTU (maximum transmission unit, or the largest packet that can be transmitted from the port) capability, RDMA (remote direct memory access, or the ability for a remote node to directly access the memory of a source node without involving the operating system of the source node) capability and TCP (transport control protocol) offload engine (TOE) support (the network interface offloads processing of the TCP/IP stack to a network controller). Other network capabilities could include a link's physical security capabilities, such as different encryption standards supported, as well as a link's gateway capabilities (such as when two nodes are in geographically separate locations, and the geographic locations are linked by either a faster or slower network connection).

In one embodiment, the node automatically populates and updates a replicated database (RDB) or other distributed database with information about IP addresses and network capabilities of other nodes in the cluster. As used herein, distributed database and RDB refer to distributed database technology where configuration and management information is distributed through the network rather than located in a single manager. A distributed database replicates information at multiple or possibly all nodes, and propagates updates to the information throughout the network. Thus, in one embodiment, each node in the cluster includes information indicating IP addresses and corresponding or associated network port capabilities for all other nodes in the cluster. As such, all nodes in the cluster have information about what are IP addresses of remote nodes, and what are the underlying network capabilities of those addresses. Such information about the nodes in the cluster allows the nodes to determine what networks may be available for communication with other nodes in the cluster. A node dynamically selects a network type for cluster communication with another node. The nodes also include information that indicates where data is stored through the cluster. Thus, for a request for data at any node, the node receiving the request can determine where in the cluster the information is located (i.e., what node), and what networks, and network addresses and associated network capabilities can be used to access the remote node. The receiving node selects from among identified networks and networks addresses to connect to the other (remote) node.

When a node that receives a request determines where the data is located, and how the remote node having the data can be accessed, the node establishes a connection to the remote node to access the data. In one embodiment, establishing the connection includes establishing a communication session via a network connection to the remote node that owns or hosts the data requested by the client. The process of selecting the connection can be performed as described herein to automatically establish a connection with the maximum available network capabilities to enable a best-performance access to the data. Contrast such a selection and connection process to current methods of having a single network to be able to access the data. As described herein, if there are multiple networks with different capabilities, the node can select the network connection with the highest capabilities. For example, if a requesting node determines from information in a local copy of an RDB that a remote node has an IP address with RDMA capability, the requesting node can select the IP address with RDMA capability over an IP address not having RDMA capability. In one embodiment, the node includes a session manager that establishes a connection according to a priority order, where information such as RDMA capability is higher on the priority list than non-RDMA. A similar process could be followed for selecting a connection having higher bandwidth than another.

In addition to selecting a preferred connection, the node can automatically enable a software stack used for establishing a session connection, where the software stack is selected and enabled automatically to match the network capability of the selected connection. More specifically, for RDMA capable networks, an RDMA stack is used, which supports interfaces and executes logic that are different from what would be employed by Ethernet or other types of networks. For example, an RDMA stack transfers or obtains data directly and remotely from application buffers of a remote node, which is in contrast to Ethernet where lower level Ethernet drivers allocate buffers into which incoming messages will be placed. Note that higher performance mechanisms may be automatically selected and employed in node-to-node communication, but the communication mechanisms are hidden from the applications where data access requests originate. At the application level (i.e., the frontend or user interface experience) simply sees higher network performance with lower CPU utilization, higher bandwidth, and/or lower latencies.

Figure 2:
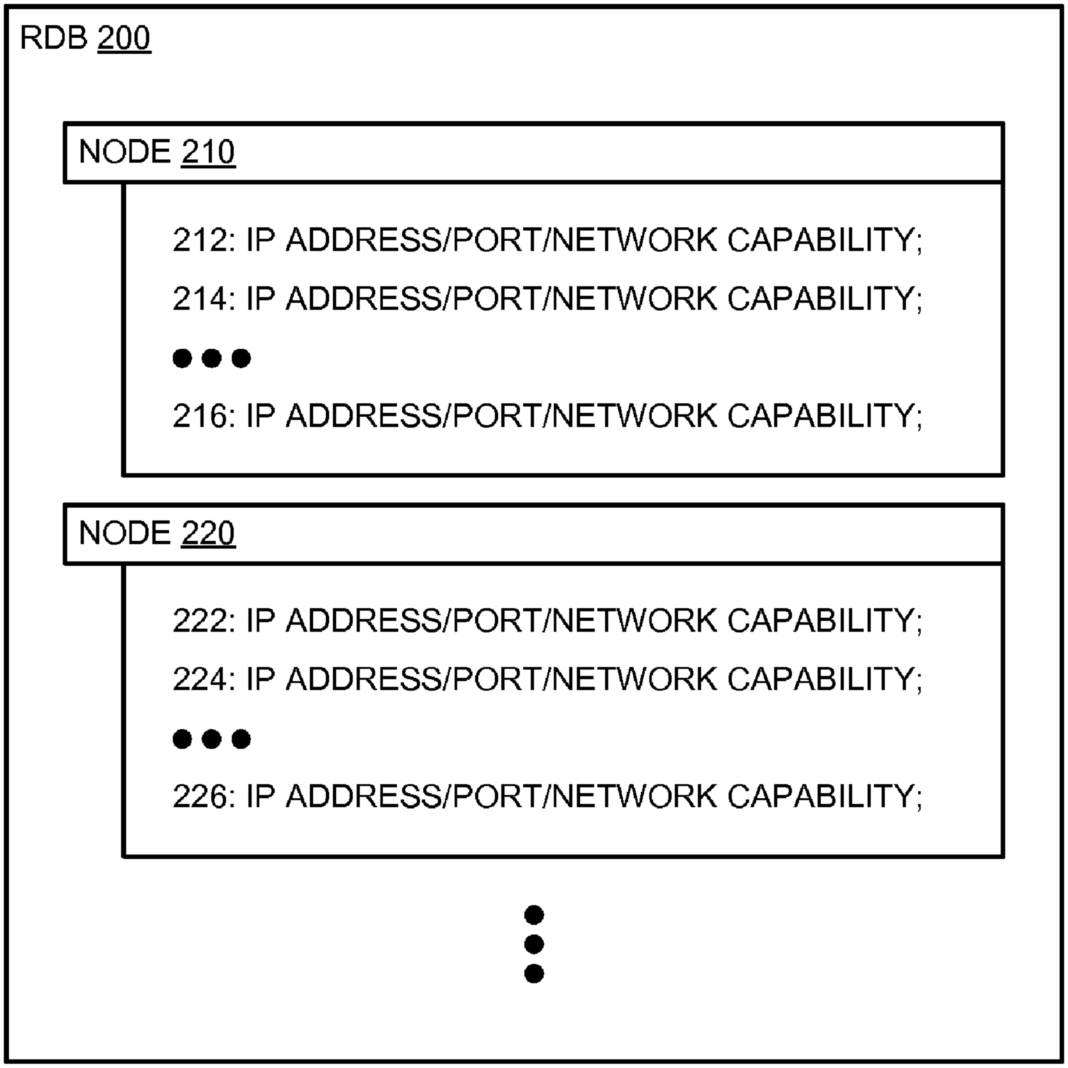
FIG. 2 is an embodiment of a representation of a replicated database.

FIG. 2 is an embodiment of a representation of a replicated database. RDB 200 is one example of a distributed or replicated database according to any embodiment herein. RDB 200 enables a node to store access information or network communication information about nodes in a cluster. An example of how such information may be organized is provided, but should be understood as illustrative, rather than limiting. The type of information would be the same or similar in other implementations, even though the order or structure of the data may be changed.

In one embodiment, RDB 200 includes lists of information. Each node may be indexed, such as node 210 and node 220. Thus, when a node determines a location of data or services within a cluster, the node may then access RDB 200 with the remote node's identifier as an index to determine what possible ways the node could be accessed and determine what the preferred method of access would be. Node 210 is illustrated with entries 212, 214, . . . , 216, which each list an Internet Protocol (IP) address, a port, and one or more network capabilities. In one embodiment, the network capabilities are designated by an identifier, or a mask, or a string, depending on the implementation within the cluster. Each different designation type would require a different type of processing to determine what information is represented by the network capability. In one embodiment, the network capabilities can act as inputs to modules or subroutines of a session manager and/or network stack implementation.

Similar to the information stored for node 210, information is stored for node 220, as illustrated by entries 222, 224, . . . , 226, which store information about addresses, ports, and network capabilities. Although IP addresses are specifically shown because they are commonly known and used, there may be implementations where different types of network addresses are employed. Note that RDB 200 may contain other information for as many nodes as exist in the cluster. In one embodiment, RDB 200 includes similar information for other clusters. In one embodiment, RDB 200 can be considered to be multiple separate databases, each containing information about a single cluster, specifying the information for all nodes of that cluster.

Figure 3:
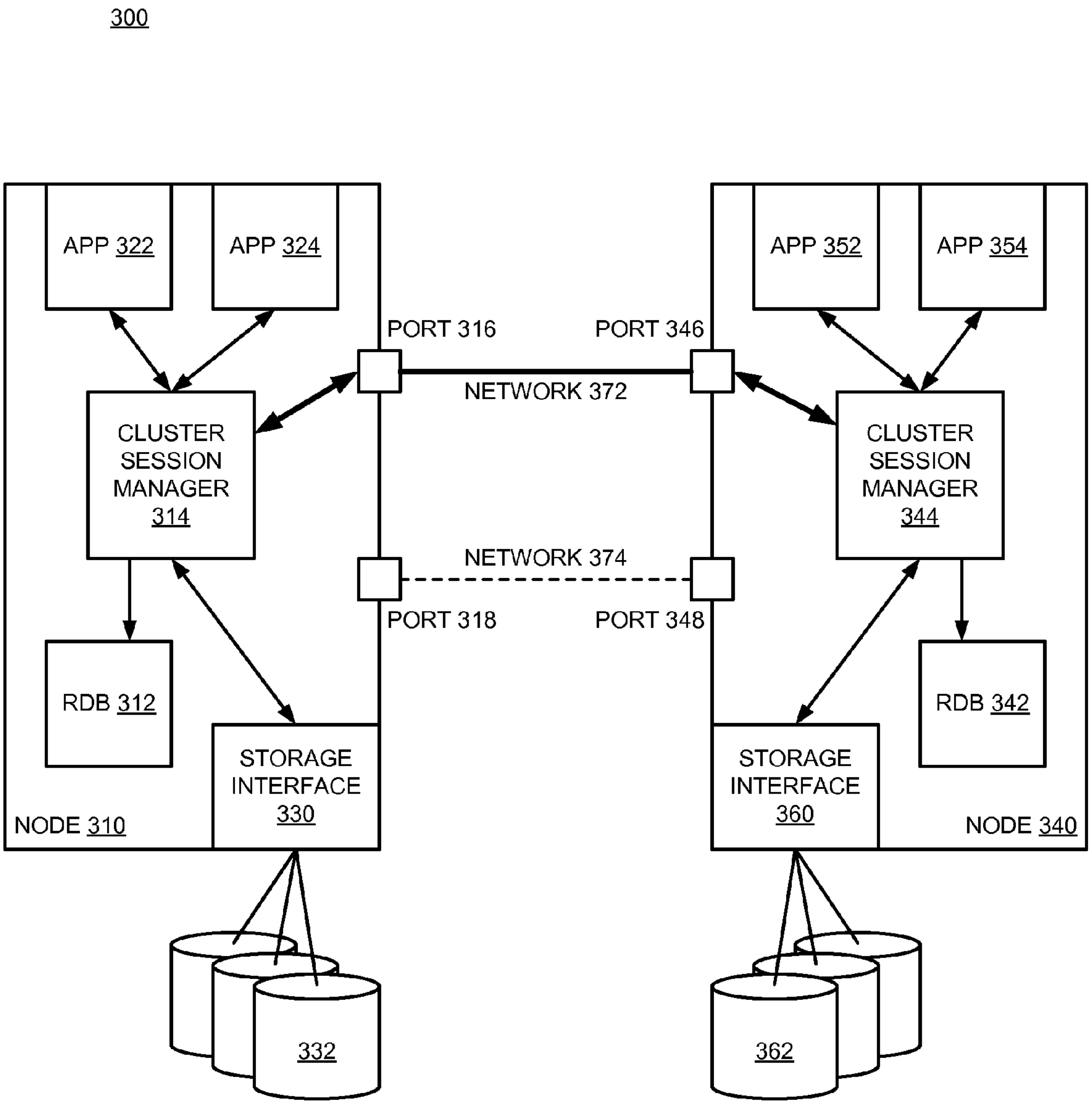
FIG. 3 is a block diagram of an embodiment of a cluster of nodes having nodes that select cluster paths based on characteristics of the path.

FIG. 3 is a block diagram of an embodiment of a cluster of nodes. Each of the nodes of the cluster may be interconnected by various network paths. In one embodiment, a network path is selected based on characteristics of the path(s). Cluster 300 is an example of a cluster according to any embodiment described herein. In addition to other details specifically shown in the nodes (node 310, node 340) of cluster 300, note that cluster 300 specifically illustrates the concept of a cluster of storage nodes.

Node 310 includes RDB 312, which is an example of a replicated database as described herein. In one embodiment, node 310 includes cluster session manager (CSM) 314, which enables node 310 to establish network connections with other nodes in cluster 300 to access data from the other nodes. CSM 314 accesses RDB 312 to determine what networks, addresses and network capabilities are associated with other nodes to determine how to connect to those other nodes.

Node 310 has one or more applications executing on node 310 that request access to data stored on another node in cluster 310. The applications are illustrated by app 322 and app 324, which may be end-user applications or system applications. An end-user application is an application with which a user directly interacts. That is, the application presents a UI that enables input and output from/to a user. A system application is an application that does not directly interact with a user, and may be any of a number of types of executables, kernels, or drivers. System applications may request data on behalf of end-user applications.

Consider a request for data made by application 322. Node 310 determines the requested data is owned by node 340, rather than being local to node 310. Application 322 sends the request to CSM 314, which may then access RDB 312 to determine what addresses and network capabilities are available to connect to node 340. Based on the information determined from RDB 312, CSM 314 selects network 372 accessible via port 316 to connect to node 340. Node 340 connects to network 372 via port 346, and establishes a remote session with node 310 over network 372 through ports 316 and 346. CSM 344 may receive the request and access (directly or indirectly) storage interface 360, which manages access to data store 362. Storage interface 360 obtains the requested data in the case of a read operation, or writes the requested data in the case of a write operation.

Similar to node 310, node 340 may include one or more applications 352 and 354, CSM 344, and RDB 342. In the case where one of applications 352 or 354 request data access to data stored at data store 332 of node 310, a similar connection process may occur in the reverse order as described above.

As used herein, a "session" refers to active connections established between two nodes over a network for a single application. In one embodiment, a session can include multiple connections between the same pair of nodes. A single session may include multiple connections, and could be over different networks. Multiple applications can share a session of have private, non-shared sessions within a cluster. Thus, CSMs 314 and 344 may establish sessions for their respective nodes that include one or more connections. A node could also establish multiple concurrent sessions, which could include different sessions over different networks, as well as different sessions over different clusters (assuming a node participates in multiple clusters).

Note that, as illustrated, nodes 310 and 340 could communicate over network 372 between ports 316 and 346, or over network 374 between ports 318 and 348. In one embodiment, network 372 is selected over network 374 because there is a network capability that increases performance when connecting via network 372. For example, a connection that supports RDMA is generally a more efficient connection mechanism than a non-RDMA connection. As another example, network 372 may offer a higher bandwidth connection than network 374. Note that the determination of which network offers the highest performance may be determined based on fixed (e.g., whether a network supports RDMA, whether a particular encryption or security feature is supported, etc.), or dynamic (e.g., whether a load on a particular network is high enough that another connection would be more efficient) factors. Thus, in one embodiment, network 372 is selected over network 374 because a traffic load on network 372 is lighter than a load on network 374, which would suggest better performance by using network 372.

In one embodiment, network 372 is selected over network 374 because network 374 is inaccessible. Thus, network 374 may appear to offer better performance based on its network characteristics; however, network 372 is selected because network 374 is temporarily unavailable. The network can be unavailable if the network is experiencing a temporary failure, or there are no available connections over the network.

Establishing a session includes determining the IP addresses and associated network capabilities for a remote node that will be connected to. In one embodiment, all information is stored in the RDBs (312, 342). In one embodiment, determining the IP address and network capability information includes querying the remote node to obtain the information. Any type of query communication known in the art may be used to accomplish the query. Information obtained through querying may then be received from the remote node, and stored in the RDB of the requesting node. In one embodiment, such queries to determine network address and network capability information is performed independent of establishing a connection. Thus, a CSM could generate a query as part of establishing a session, or an RDB management entity (not shown) or network capability determiner (e.g., 424 of FIG. 4) could generate a query to a remote node and update cluster information with the response to the query.

In one embodiment, CSM 314 and CSM 344 store connection preferences. Based on each node's network configuration information, each node may have information that indicates what connection would provide the best performance. Such a connection would be selected over a different connection. If the preferred connection is unavailable or there is a high load on the network associated with that connection, a next-mostefficient connection may be selected, and so on to highest-performance connection available.

Figure 4:
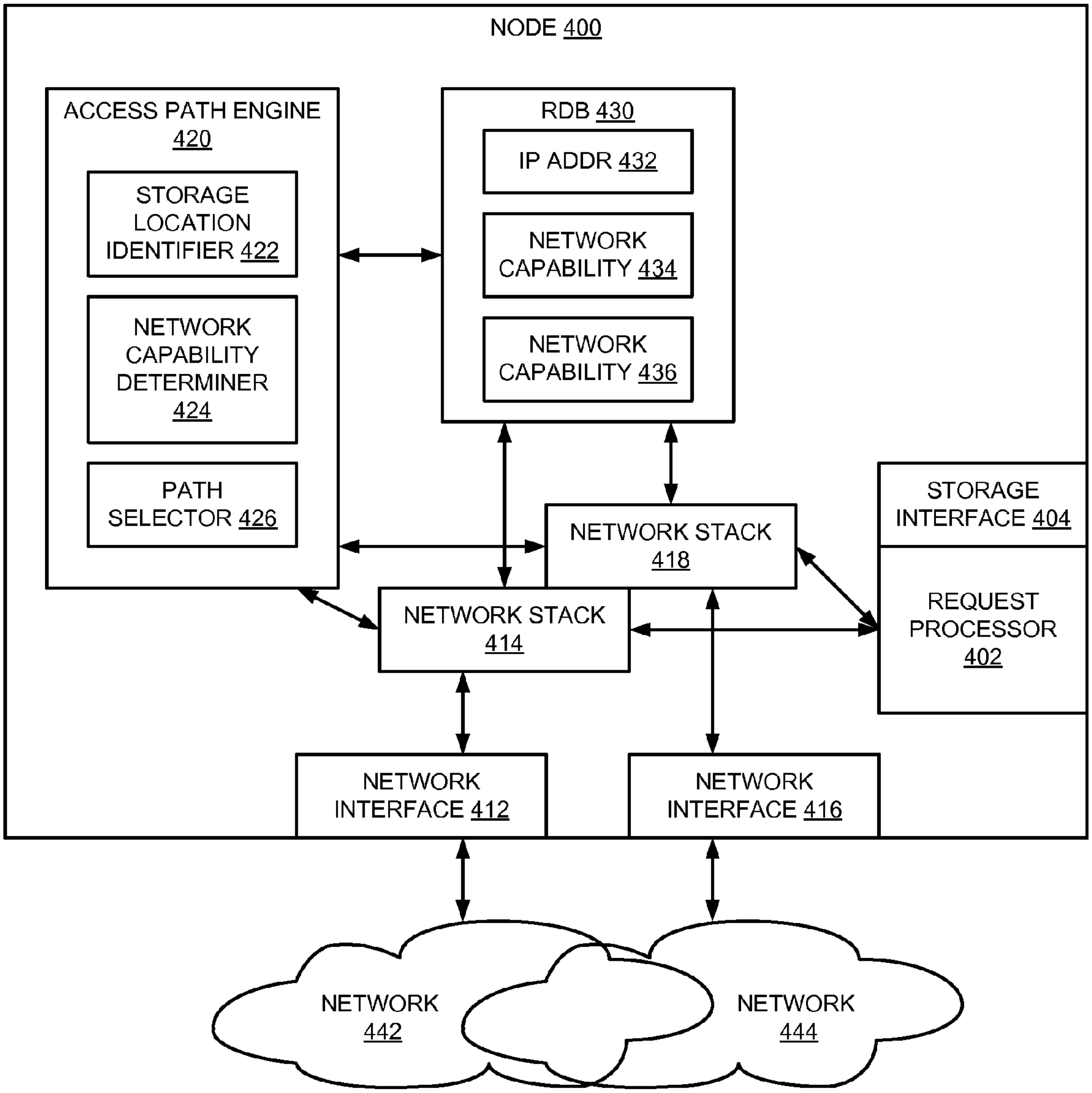
FIG. 4 is a block diagram of an embodiment of a cluster node having a replicated database and an access path engine.

FIG. 4 is a block diagram of an embodiment a cluster node having a replicated database and an access path engine. Node 400 is one example of a node of a cluster according to any embodiment described herein. Certain details of node 400 are described functionally with reference to various modules or functional blocks. The functionality described can be implemented in software, hardware, or a combination, and may be implemented by components described with respect to previous figures.

Node 400 includes multiple network interfaces 412 and 416, which provide access to different networks 442 and 444, respectively. Networks 442 and 444 are shown as partially overlapping to represent the fact that the networks may overlap as to which nodes in the cluster are part of the network. Some networks may include all nodes in the cluster (e.g., a standard Ethernet network), and other networks will include only a subset of nodes. Thus, while shown as partially overlapping, certain networks could be fully overlapping, or one network could be a subset of another network. It is also possible to have parallel networks where two networks have no common nodes.

Examples of network types may include, but are limited to: Ethernet, which is a frame-based transmission standard for local area network communication, frequently implemented with collision detection, and is understood by those skilled in the art; InfiniBand, which is a bidirectional, point-to-point serial communications link over a switched fabric, and is understood by those skilled in the art; and iWARP (Internet Wide Area RDMA (Remote Direct Memory Access) Protocol), which is a hardware-based communication protocol understood by those skilled in the art that can enable zero-copy transmission (i.e., eliminating copying between application memory and data buffers in a host operating system), and is generally considered to be reduced-overhead as it reduces operating system involvement and memory usage. Specific Ethernet standards may include 1 GbE (1 gigabit Ethernet, referring to a 1 Gb bandwidth), 10 GbE (10 gigabit Ethernet, referring to a 10 Gb bandwidth), 10 Gb/s|SDR InfiniBand (10 gigabit per second, single data rate standard), 20 Gb/s|DDR InfiniBand (20 gigabit per second, dual data rate standard), 40 Gb/s|QDR Infiniband (40 gigabit per second, quadruple data rate standard), and 10 GbE iWARP (iWARP implemented over 10 gigabit Ethernet). Other network types will be understood by those of skill in the art.

Network interfaces 412 and 414 include physical connections to enable the nodes in the cluster to connect to each other. Network interfaces 412 and 414 also include software components, such as drivers or software components executing on a network interface circuit/card (NIC). Each network interface 412 and 414 has an associated network stack 414 and 418, respectively. When a particular network is selected for communication as described herein, node 400 configures the communication mechanisms, including invoking a network stack that corresponds to the selected network. Note that one or more network addresses (e.g., IP addresses) may correspond to each network interface 412, 416, and one or more ports may be enabled on each address.

As illustrated, node 400 includes RDB 430, which includes address information (IP address 432) and network capabilities (434, 436) for nodes in a cluster of which node 400 is part. For purposes of the illustration of FIG. 4, IP address 432 is an address selected from among many addresses stored in RDB 430 to access data from a remote node in the cluster. IP address 432 is selected by node 400 because the address has associated network capabilities 434 and 436, which indicates that better performance in data access will be achieved by using IP address 432 to connect to the remote node than some other address for the remote node that may be stored in RDB 430.

Network stacks 414 and 418 are generally understood by those skilled in the art, and are not described in detail for the sake of clarity. The network stacks obtain information from RDB 430 to configure a communication session with the remote node. Supposing that network 444 is the network associated with IP address 432 found in RDB 430, network stack 418 would obtain the address and network capability information and configure network interface 416 to communicate over network 444 to the remote node.

In one embodiment, node 400 includes request processor 402, which enables node 400 to respond to remote requests for data access. For example, consider that a remote node receives a request for access to data owned by node 400. The remote node may determine that network 442 is the best network it can use to access node 400, and so it establishes a connection with node 400. Request processor 402 represents component, whether hardware, software, or a combination, which enable node 400 to process the request by the remote node. Request processor 402 may thus include storage interface components such as storage interface 330 of FIG. 3, RDMA mechanisms, etc.

Node 400 also includes access path engine 420, which represents one or more components that enable node 400 to dynamically determine a path to a remote node in a cluster. Access path engine 420 includes storage location identifier 422, which represents mechanisms to determine where in a cluster of nodes requested data is located. Processes and systems for determining the location of data in a cluster are known to those of skill in the art, and are not described in detail for the sake of clarity. Storage location identifier 422 may include tables and processing algorithms to determine where data is located. Thus, when a request to access data is received, storage location identifier 422 can determine where the data is located or identify a node in the cluster that has the data. Storage location identifier 422 identifies one or more addresses that can be used to access the remote node.

Access path engine 420 includes network capability determiner 424 and path selector 426, which can access and use information in RDB 420 to distinguish network communication capabilities between different networks for an identified node, and select a path according to the information. In one embodiment, network capability determiner 424 includes a priority table or list, which indicates a preferred order of connection. In one embodiment, connection rules are employed rather than, or in conjunction with, a table. Network capability determiner 424 obtains and may process (e.g., organize or align data fields) network capability information so path selector 426 can determine what path to use to access the remote node. Path selector 426 ultimately makes a determination of what address to use to access the remote node. With the address selected, access path engine 420 indicates the address to the appropriate network stack 414, 418, which then configures node 400 to access the remote node.

Figure 5:
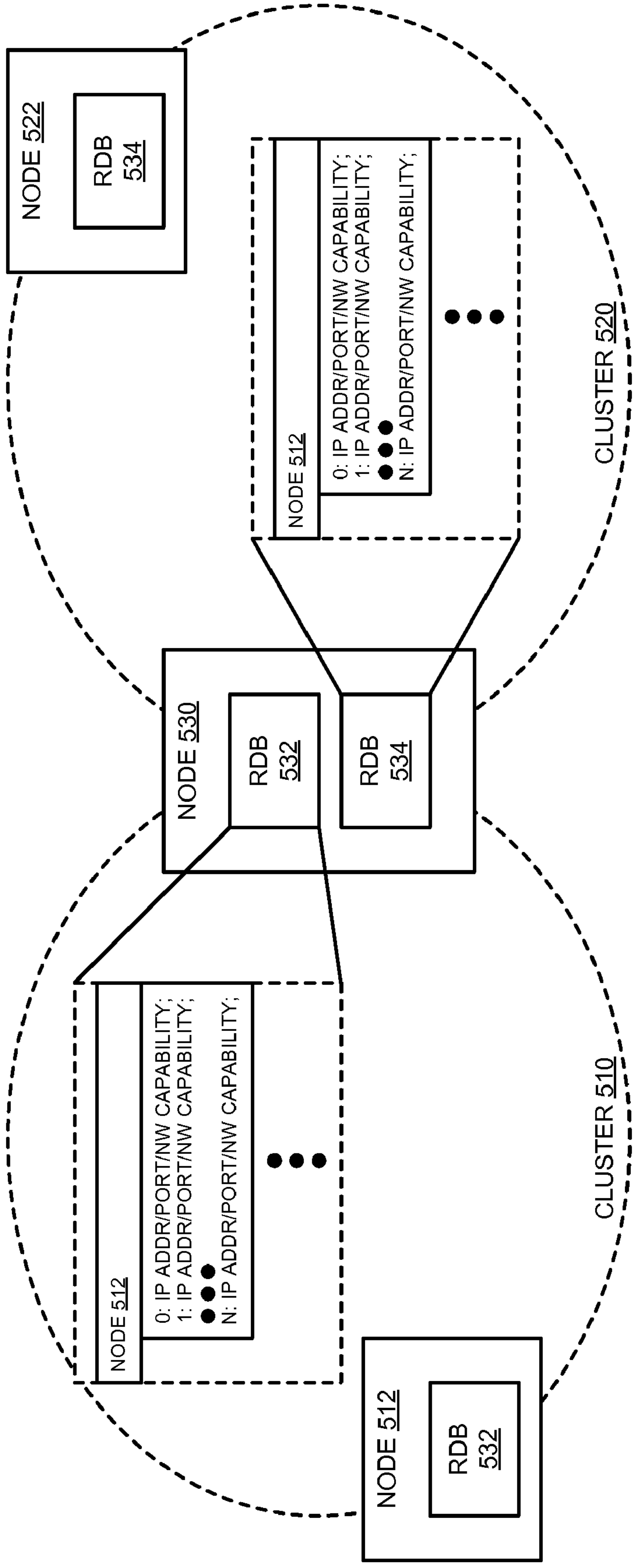
FIG. 5 is a block diagram of an embodiment of a cluster node that participates in multiple separate clusters.

FIG. 5 is a block diagram of an embodiment of a cluster node that participates in multiple separate clusters. Node 530 participates in both cluster 510 and cluster 520. Clusters 510 and 520 are separate clusters because they have individual cluster management. The two clusters could overlap participating nodes, but are different clusters as long as they are managed as separate clustering implementations with communication specific to the cluster. Cluster 510 includes nodes 512 and 530, and cluster 520 includes nodes 522 and 530. There may be many other nodes not shown for purposes of clarity in description.

Node 530 is an example of a cluster node according to any embodiment described herein, and may include any components of a node as described herein. Node 530 is specifically illustrated with RDB 532 and RDB 534. While shown as separate blocks in FIG. 5, it will be understood that the separation of the information in RDBs 532 and 534 may be conceptual only, or may also be two separate databases. The designators represent a compilation of information necessary for accessing nodes within the separate clusters. Thus, RDB 532 includes information necessary to access nodes within cluster 510, such as node 512. Thus, node 512 is identified within RDB 532, and has entry lines 0, 1, . . . , N specifying IP addresses, ports, and network capabilities of node 512, as well as other nodes of cluster 510. Node 512 includes RDB 532, or the information about nodes within cluster 510. If node 512 participates in another cluster (e.g., a cluster not shown in FIG. 5), the node would also include remote node information for that cluster (again, as part of a single RDB, or as a separate RDB).

RDB 534 likewise includes information necessary to access nodes within cluster 520, including node 522. RDB 534 identifies node 522, and has entry lines 0, 1, . . . , N specifying IP addresses, ports, and network capabilities of node 522. RDB 534 also include information about other nodes (not shown) within cluster 520. The information in the separate RDBs may be separated by tagging the information as belonging to a certain cluster. Clustering protocols can specify the cluster in a header of communication, which the node can check against RDB information. Certain network connection between two nodes may exist in one cluster and not another. Thus, two nodes may exist in two separate clusters, and be able to access on network connection in one cluster, but not in the other.

One cluster application may be for purposes of primary storage supporting client access to data. A second cluster application can be mirror which moves data from one data center cluster to another data center cluster. A third cluster application may be backup, which moves data from one cluster to backup disks or tapes. Clusters 510 and 520 may be any combination of such cluster applications.

Figure 6:
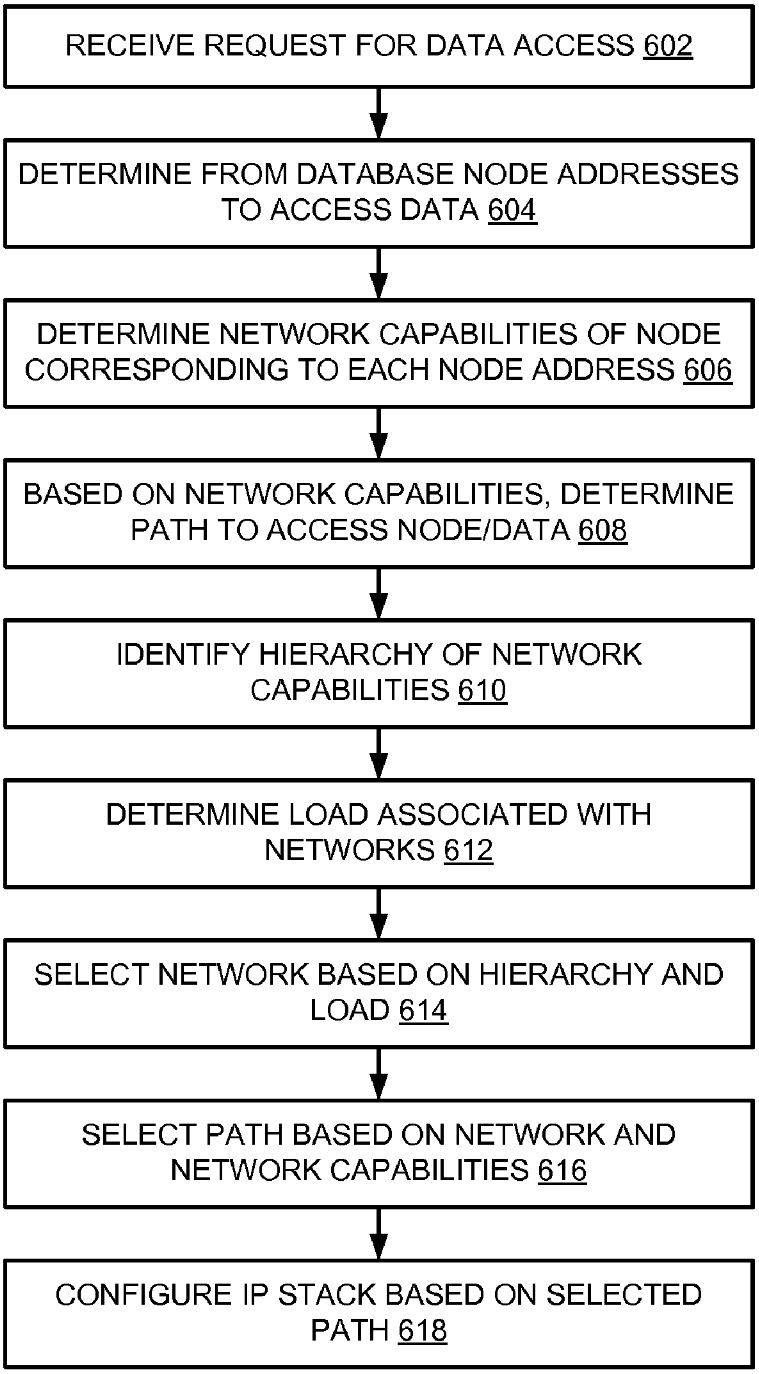
FIG. 6 is a flow diagram of an embodiment of a process for automatic selection of a network path in a cluster based on network configuration information for nodes in the cluster.

FIG. 6 is a flow diagram of an embodiment of a process for automatic selection of a network path in a cluster based on network configuration information for nodes in the cluster. Flow diagrams as illustrated herein provide examples of sequences of various process actions. Although shown in a particular sequence or order, unless otherwise specified, the order of the actions can be modified. Thus, the illustrated implementations should be understood only as an example, and the process for establishing the secure channel can be performed in a different order, and some actions may be performed in parallel. Additionally, one or more actions can be omitted in various embodiments of the invention; thus, not all actions are required in every implementation. Other process flows are possible.

The flow diagram as described in FIG. 6 summarizes processes performed by the components described in other figures. A node (e.g., node 310 of FIG. 3 or node 400 of FIG. 4) of a cluster receives a request for access to data, 602. The request may be to read or write data. When the data is stored on a remote node (e.g., node 340 of FIG. 3), the receiving node determines or identifies from a local database of information what node in the cluster stores the data, and what addresses are associated with the remote node, 604. The receiving node determines network capabilities corresponding to each of the addresses associated with the remote node, 606. The receiving node makes the determinations with reference to information in a distributed database (e.g., RDB 200 of FIG. 2).

Based on network capabilities, the receiving node determines a path to access the requested data from the remote node, 608. Determining the path to access the requested node may include a number of operations. In one embodiment, a path determiner identifies a hierarchy of network capabilities, 610, which may be stored in hierarchical order or stored with hierarchical information. In one embodiment, a path determiner determines a load associated with identified networks, 612. That is, a network may be unavailable due to traffic on the network, or bandwidth may be limited on the network due to traffic by other devices. The path determiner may select a network based on hierarchy, available bandwidth or other available network characteristic, or a combination of the two, 614. The path determiner selects a path based on the network and the network capabilities associated with the network, 616. The node then configures the network stack (e.g., network stack 414 of FIG. 4) such as an IP stack, based on the selected path, 618. Communication can then occur over the selected network path.

Figure 7:
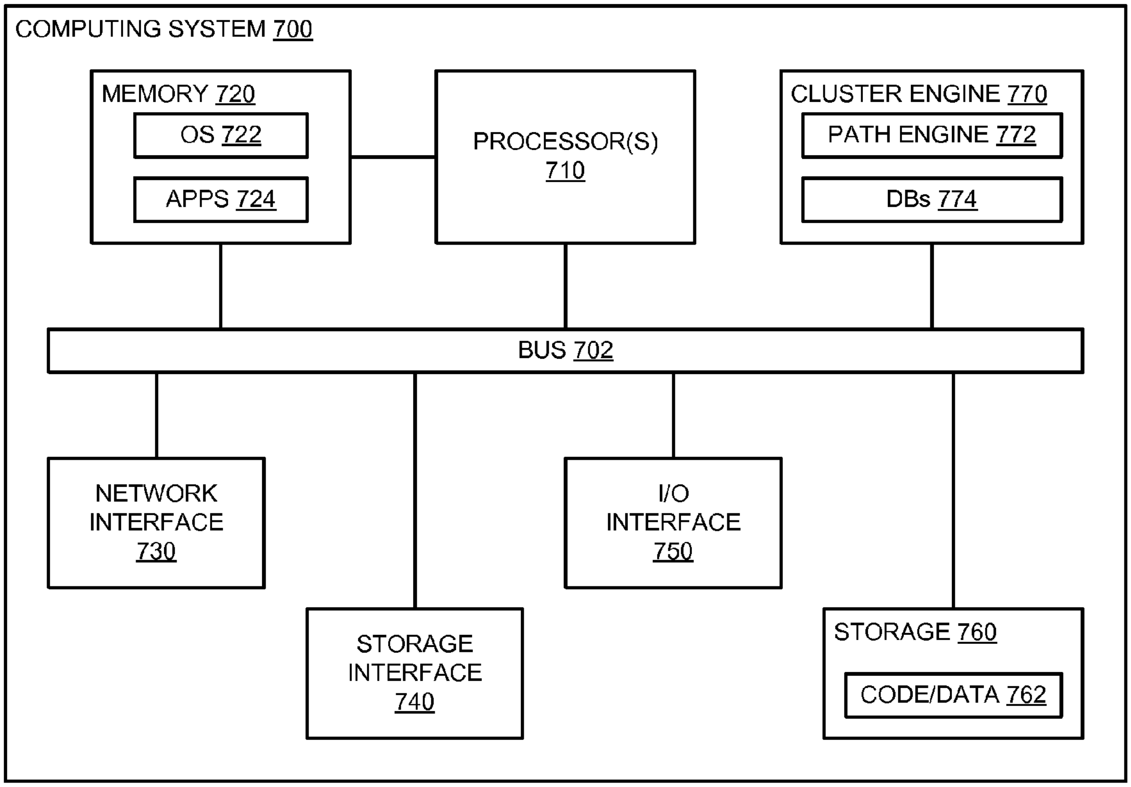
FIG. 7 is a block diagram of a computing system that is a cluster node on which embodiments of the invention can be implemented.

FIG. 7 is a block diagram of a computing system on which embodiments of the invention can be implemented. Computing system 700 represents a system that could perform as a node of a cluster according to any embodiment described herein (e.g., node 400 of FIG. 4). Computing system 700 is depicted with various components that may be present in whole or in part, and additional components or subcomponents may also be present. Computing system 700 includes one or more processors 710, which executes instructions and may perform various operations as described herein. Processor 710 may include any type of microprocessor, central processing unit (CPU), processing core, etc. Processor 710 controls the overall operation of the computing system 700, and may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 720 represents the main memory of the computing system 700, and provides temporary storage for code (e.g., software routines or series of instructions, commands, operations, programs, data, etc.) to be executed by processor 710. Memory 720 may include read-only memory (ROM), flash memory, one or more varieties of random access memory (RAM), or the like, or a combination of such devices. Memory 720 stores, among other things, operating system (OS) 722 that acts as a software platform, and applications (apps) 724, which enable user interaction and/or interaction among software components.

The various components of computing system 700 are coupled to bus 702. Bus 702 is an abstraction that represents any one or more separate physical buses, communication lines, and/or point-to-point connections, connected by appropriate bridges, adapters, and/or controllers. Therefore, bus 702 may include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire").

Computing system 700 includes network interface 730, which represents hardware and software (e.g., drivers) that enable computing system 700 to communicate with remote devices (e.g., clients) over one or more networks as described herein. Processor 710 may execute various network stacks to control interfaces to various networks through network interface 730. Computing system 700 may include storage interface/adapter 740, which enables computing system 700 to access attached storage (e.g., a storage area network or other storage subsystem) and may be, for example, a Fibre Channel adapter, a SCSI adapter, etc. Computing system 700 includes one or more input/output (I/O) interface(s) 750, which may include one or more interface components to connect with other electronic equipment, for example, custom connections, blade adapters, etc. Additionally, I/O interfaces 750 can include video, audio, and/or alphanumeric interfaces through which a user interacts with computing system 700. Computing system 700 may include one or more internal storage device(s) 760. Storage 760 can be any conventional medium for storing large volumes of data in a non-volatile manner, such as magnetic, optical, and/or semiconductor-based disks. Storage 760 may hold code and/or data 762 in a persistent state (i.e., the value may be retained despite interruption of power to computing system 700).

Computing system 700 includes cluster engine 770, which is an abstraction to represent components (software and/or hardware) that enable computing system 700 to be part of a cluster of nodes as described herein. Thus, cluster engine 770 may include path engine 772 to determine a network path to use to access other nodes in the cluster, which may be an example of access path engine 420 of FIG. 4. Cluster engine 770 may also include one or more databases (DBs) 774, such as RDB 430 of FIG. 4 and network configuration database 112 of FIG. 1. DBs 774 store network configuration information used by path engine 772 to determine an access path to a remote node in a cluster.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communication interface to send data via the communication interface. A machine readable storage medium may cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A computer-implemented method comprising:

receiving, from a requesting application at a receiving node of a storage cluster, a request for data, each node of the storage cluster providing data access services over at least one address and multiple nodes providing data access services over multiple addresses;

determining, at the receiving node, a node of the storage cluster from which the requested data is accessible;

identifying for the determined node one or more network addresses over which the determined node provides data access services, where each network address has corresponding network capabilities; and selecting an access path to the determined node, including selecting one of the network addresses, based on an expected performance of a connection over the selected access path.

2. The method of claim 1, wherein the network capabilities include any one or more of MTU (maximum transmission unit) capability, RDMA (remote direct memory access) capability, TCP (transport control protocol) offload engine (TOE) support, encryption support, and gateway capabilities of a link.

3. The method of claim 1, wherein each node of the storage cluster presents an image of the storage cluster to clients as a single storage location.

4. The method of claim 1, wherein each node of the storage cluster provides data access services over at least one of multiple network types, and wherein identifying the network addresses comprises determining one or more network addresses for each network type.

5. The method of claim 4, wherein the network types include any one or more of Ethernet, InfiniBand, and iWARP (Internet Wide Area RDMA (Remote Direct Memory Access) Protocol).

6. The method of claim 4, further comprising establishing a session over the access path with the node of the storage cluster from which the requested data is accessible, wherein the node already has an established session over an access path on a different network type than a network type of the selected address, the node to maintain concurrent sessions on the different network types.

7. The method of claim 1, wherein selecting the access path comprises selecting the access path in accordance with a priority order of multiple network connections.

8. The method of claim 1, wherein selecting the access path based on an expected performance comprises selecting the access path based on both static and dynamic performance characteristics, where static characteristics include inherent network capabilities and dynamic characteristics include network connection conditions.

9. The method of claim 8, wherein selecting the access path based on both static and dynamic performance characteristics comprises selecting a network type having lower inherent network capabilities but having a lower traffic load.

10. The method of claim 1, further comprising automatically setting up and configuring a network software stack to match capabilities of the selected access path.

11. An apparatus comprising:

multiple network ports to be assigned network addresses corresponding to one or more network types, each network address having corresponding network capabilities, each network address to provide an access path to data stored at the apparatus as part of a storage cluster;

a user interface to receive a request for data available from the apparatus; and an access path engine to determine a node of the storage cluster from which the requested data is accessible, identify for the determined node one or more network addresses and corresponding network capabilities over which the determined node provides data access services, and select an access path to the determined node, including select one of the network addresses, based on an expected performance of a connection over the selected access path.

12. The apparatus of claim 11, wherein the network capabilities include any one or more of MTU (maximum transmission unit) capability, RDMA (remote direct memory access) capability, TCP (transport control protocol) offload engine (TOE) support, encryption support, and gateway capabilities of a link.

13. The apparatus of claim 11, wherein the user interface is to further present an image of the storage cluster to clients as a single storage location.

14. The apparatus of claim 11, wherein each node of the storage cluster provides data access services over at least one of multiple network types, and wherein the access path engine to further determine one or more network addresses for each network type.

15. The apparatus of claim 14, wherein the network types include any one or more of Ethernet, InfiniBand, and iWARP (Internet Wide Area RDMA (Remote Direct Memory Access) Protocol).

16. The apparatus of claim 14, further comprising the access path engine to establish a session over the access path with the node of the storage cluster from which the requested data is accessible, wherein the node already has an established session over an access path on a different network type than a network type of the selected address, the node to maintain concurrent sessions on the different network types.

17. The apparatus of claim 11, wherein the access path engine is to select the access path in accordance with a priority order of multiple network connections.

18. The apparatus of claim 11, wherein the access path engine is to select the access path based on both static and dynamic performance characteristics, where static characteristics include inherent network capabilities and dynamic characteristics include network connection conditions.

19. The apparatus of claim 11, wherein the access path engine is to select a network type having lower inherent network capabilities but having a lower traffic load.

20. The apparatus of claim 11, further comprising the access path engine to automatically set up and configure a network software stack to match capabilities of the selected access path.

21. A system comprising:

multiple nodes coupled in a storage cluster, each node having at least one network multiple network ports to be assigned a network address having corresponding network capabilities, each network address to provide an access path to data stored at the node;

a replicated database (RDB) to store network access information about each node of the cluster, including network addresses of each node, ports, and network capabilities of each network address of each node; and an access path engine to determine a node of the storage cluster from which the requested data is accessible, identify for the determined node one or more network addresses and corresponding network capabilities over which the determined node provides data access services, and select an access path to the determined node, including select one of the network addresses, based on an expected performance of a connection over the selected access path.

22. The system of claim 21, wherein the network capabilities include any one or more of MTU (maximum transmission unit) capability, RDMA (remote direct memory access) capability, TCP (transport control protocol) offload engine (TOE) support, encryption support, and gateway capabilities of a link.

23. The system of claim 21, wherein each node of the storage cluster is to further present an image of the storage cluster to clients as a single storage location.

24. The system of claim 21, wherein each node of the storage cluster provides data access services over at least one of multiple network types, and wherein the access path engine to further determine one or more network addresses for each network type.

25. The system of claim 24, wherein the network types include any one or more of Ethernet, InfiniBand, and iWARP (Internet Wide Area RDMA (Remote Direct Memory Access) Protocol).

26. The system of claim 24, further comprising the access path engine to establish a session over the access path with the node of the storage cluster from which the requested data is accessible, wherein the node already has an established session over an access path on a different network type than a network type of the selected address, the node to maintain concurrent sessions on the different network types.

27. The system of claim 21, wherein the access path engine is to select the access path in accordance with a priority order of multiple network connections.

28. The system of claim 21, wherein the access path engine is to select the access path based on both static and dynamic performance characteristics, where static characteristics include inherent network capabilities and dynamic characteristics include network connection conditions.

29. The system of claim 21, wherein the access path engine is to select a network type having lower inherent network capabilities but having a lower traffic load.

30. The system of claim 21, further comprising the access path engine to automatically set up and configure a network software stack to match capabilities of the selected access path.

* * * * *